(12) United States Patent
Bhatnagar et al.

(10) Patent No.: US 7,979,747 B2
(45) Date of Patent: Jul. 12, 2011

(54) INTERACTIVE PROBLEM RESOLUTION PRESENTED WITHIN THE CONTEXT OF MAJOR OBSERVABLE APPLICATION BEHAVIORS

(75) Inventors: Radhika Bhatnagar, Cary, NC (US); Barnaby L. Court, Morrisville, NC (US); Michael P. Etgen, Cary, NC (US); Anjan R. Kundavaram, Durham, NC (US); Elizabeth A. Schreiber, Cary, NC (US); David B. Styles, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/389,670

(22) Filed: Feb. 20, 2009

(65) Prior Publication Data

US 2010/0218030 A1  Aug. 26, 2010

(51) Int. Cl.
*G06F 11/00* (2006.01)
(52) U.S. Cl. ............................................ 714/38; 714/26
(58) Field of Classification Search .................. None
See application file for complete search history.

(56) References Cited

U.S. PATENT DOCUMENTS

| 5,528,516 | A | 6/1996 | Yemini et al. |
| 6,393,386 | B1 * | 5/2002 | Zager et al. ..................... 703/25 |
| 7,010,593 | B2 | 3/2006 | Raymond |
| 7,430,495 | B1 * | 9/2008 | Govindan et al. ............. 702/183 |
| 2004/0049372 | A1 * | 3/2004 | Keller ............................. 703/22 |
| 2004/0068677 | A1 * | 4/2004 | Briskey et al. .................. 714/38 |
| 2004/0078683 | A1 * | 4/2004 | Buia et al. ........................ 714/37 |
| 2005/0172306 | A1 * | 8/2005 | Agarwal et al. ............... 719/328 |
| 2005/0278273 | A1 * | 12/2005 | Uthe ................................. 707/1 |
| 2007/0220348 | A1 * | 9/2007 | Mendoza et al. ............... 714/38 |
| 2008/0082476 | A1 * | 4/2008 | Mourra et al. .................... 707/1 |
| 2008/0155336 | A1 * | 6/2008 | Joshi et al. ....................... 714/37 |
| 2009/0210745 | A1 * | 8/2009 | Becker et al. ................... 714/26 |

* cited by examiner

*Primary Examiner* — Gabriel L Chu
(74) *Attorney, Agent, or Firm* — Patterson & Sheridan, LLP

(57) ABSTRACT

A system, method, and article of manufacture are disclosed for monitoring and resolving problems detected in the application stack. The application stack may include multiple, interpedently application components which collectively provide a unified service. An interactive problem resolution program may monitor and assist users in troubleshooting an application stack installed on a separate computer system. Generally, when a problem in the application stack is detected, the IPR Program may alert users to the problem and provide information about the problem to guide users in taking steps to correct the problem.

21 Claims, 9 Drawing Sheets

```xml
- <node name="com.ibm.bbp.jsdt.AcmePayroll_da720521d5e40e74"/>   520
  - <map>
      <entry key="stack" value="com.ibm.bbp.system,com.ibm.bbp.db2,com.ibm.bbp.was,com.ibm.bbp.apache,com.ibm.bbp.jsdt.AcmePayroll_da720521d5e40e74"/>   522
    </map>
  - <node name="context">
    - <map>
        <entry key="APACHE_INSTANCE" value="AcmePayroll"/>
        <entry key="DB2_INSTANCE" value="db2inst1"/>
        <entry key="DB2_PATH" value="/home/db2inst1"/>
        <entry key="WAS_PROFILE_NAME" value="AcmePayroll"/>
        <entry key="WAS_PROFILE_PATH" value="/opt/ibm/WebSphere/AppServer/profiles/AcmePayroll"/>
        <entry key="WAS_SERVER_NAME" value="SERVER1"/>
      </map>   524
    </node>
  </node>
```

FIG. 5

PD Dependency Graph Example

Investigate Problem: A database requires an additional 1 GB of disk space ⎫ 648

Investigate Summary

✓ The recommended steps completed successfully, so the problem should be fixed. ⎫ 650

Problem description:   The database supporting Acme Payroll cannot store any new records.
Recommended steps:    Update the database settings to allow the database to use more disk space.

▶ Additional summary details

Next Step

When you try to use the application now, does it seem to be working properly?

| Yes | X No | — 652

654 ⎱ There are no more recommended steps to fix the problem, so you should leave it open for now. Use the following links to get additional assistance.

If you cannot make any progress on this problem, search Smart Market for information that can help.
If your search is not successful, use Gather data for support to collect the information you need when contacting support.

⊙ Search Smart Market for answers
⊙ Gather data for support

If the problem has been fixed or is not a concern, click Close Problem to remove it from the list of open problems. To keep it open, click Cancel.

| < Previous | | Close Problem | | Cancel |

FIG. 6D

INTERACTIVE PROBLEM RESOLUTION PRESENTED WITHIN THE CONTEXT OF MAJOR OBSERVABLE APPLICATION BEHAVIORS

BACKGROUND OF THE INVENTION

1. Field of the Invention

Embodiments of the invention generally relate to monitoring an application stack. More specifically, embodiments of the invention provide a method for interactive problem resolution presented within the context of major observable application behaviors.

2. Description of the Related Art

Businesses and organizations today often require an assortment of software products to deliver a fully functional solution or service. This set of applications, frequently referred to as an application stack, may include a wide assortment of applications. These applications are often related, but are still separate and independent applications. The applications in an application stack interact with one another to provide a particular service to end users. For example, the application stack may include an Apache® webserver, WebSphere® Application Server, and a DB2® database to support a web-based service or application.

Additionally, software frequently provides error reporting, with current examples including pop-ups to alert users of an error or writing the errors to one or more log files. Other tools may monitor an application stack and present technical error information to a user.

SUMMARY OF THE INVENTION

One embodiment of the invention includes a computer-implemented method for providing interactive problem resolution for a problem detected in a monitored application stack. The method may generally include configuring one or more processors to perform an operation. The operation itself may generally include detecting an occurrence of a problem with a first application in the monitored application stack. The monitored application stack includes a plurality of applications and wherein a second application in the monitored application stack has an operational dependency on the first application. The operation may further include determining a primary impact of the detected problem on the first application, determining, based on the operational dependency, a secondary impact of the detected problem on the second application, and generating a first description of the primary and secondary impacts of the detected problem in terms of observable application behaviors of the first and second applications. The operation may further include generating a second description of one or more suggested corrective actions to remedy the detected problem and outputting the first description and the second description to a graphical user interface display.

Another embodiment of the invention includes a computer-readable storage medium containing a program which, when executed, performs an operation for providing interactive problem resolution for a problem detected in a monitored application stack. The operation may generally include detecting an occurrence of a problem with a first application in the monitored application stack. The monitored application stack includes a plurality of applications and wherein a second application in the monitored application stack has an operational dependency on the first application. The operation may further include determining a primary impact of the detected problem on the first application, determining, based on the operational dependency, a secondary impact of the detected problem on the second application, generating a first description of the primary and secondary impacts of the detected problem in terms of observable application behaviors of the first and second applications. The operation may further include generating a second description of one or more suggested corrective actions to remedy the detected problem and outputting the first description and the second description to a graphical user interface display.

Still another embodiment of the invention includes a system having a processor and a memory containing an interactive problem resolution (IPR) application, which, when executed on the processor is configured to perform an operation for providing interactive problem resolution for a problem detected in a monitored application stack. The operation may generally include detecting an occurrence of a problem with a first application in the monitored application stack. The monitored application stack includes a plurality of applications and wherein a second application in the monitored application stack has an operational dependency on the first application. The operation may further include determining a primary impact of the detected problem on the first application, determining, based on the operational dependency, a secondary impact of the detected problem on the second application, generating a first description of the primary and secondary impacts of the detected problem in terms of observable application behaviors of the first and second applications. The operation may further include generating a second description of one or more suggested corrective actions to remedy the detected problem and outputting the first description and the second description to a graphical user interface display.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 illustrates an exemplary product dependency graph, according to one embodiment of the invention.

FIGS. 6A-6D illustrate an exemplary interactive problem resolution interface, according to one embodiment of the invention.

DETAILED DESCRIPTION OF THE PREFERRED EMBODIMENTS

Figure 1:
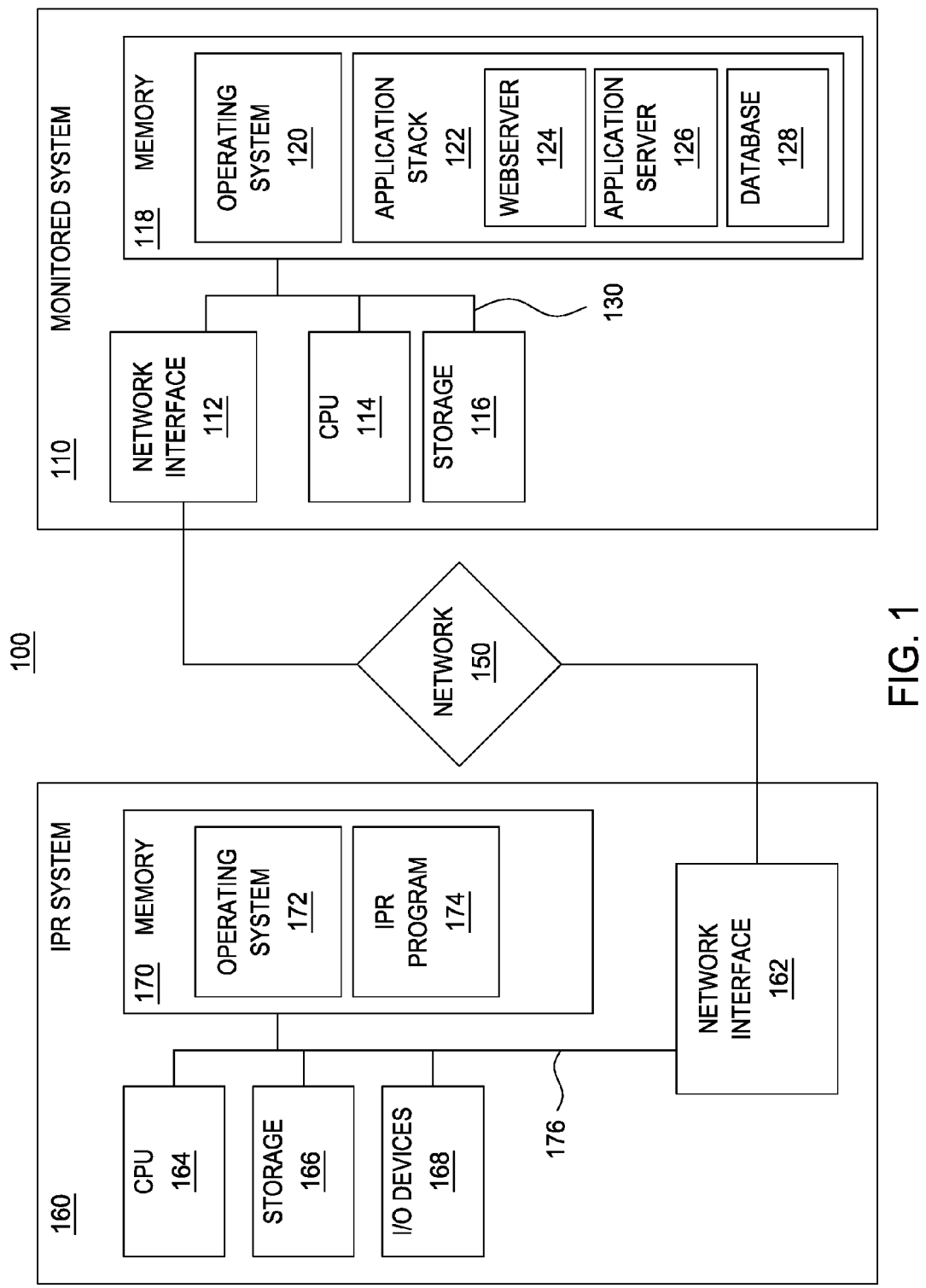
FIG. 1 illustrates an exemplary computing environment, according to one embodiment of the invention.

Embodiments of the invention generally provide a system, method and article of manufacture for monitoring an application stack and repairing or guiding a user through repairing, problems detected in the application stack. For example, an interactive problem resolution program (IPR Program) installed on a computer system may monitor and assist users in troubleshooting an application stack installed on a separate computer system. Generally, when the IPR Program detects a problem in the application stack, it may both alert users to the problem as well as provide information about the problem to guide users in taking steps to correct the problem.

Further, the IPR program may maintain information on dependencies between applications in an application stack and use this information to inform users of what impact a problem may have on their application stack. For example, in an application stack which includes a webserver, an application server and a database, the webserver may depend on both the application server and the database. That is, a problem with either the application server or the database might prevent the webserver from functioning properly. To further illustrate, if a database problem occurs, such as running out of hard disk space, the webserver may also experience a problem, such as the inability to store data sent to the webserver. In such a scenario, the problem with the database must be corrected in order to correct the problem with the webserver. However, low-skilled IT users (i.e. users lacking training in troubleshooting information technology problems) may not understand the impact a problem can have on other applications in the application stack, and thus not understand how to best troubleshoot a given problem.

Thus, maintaining dependency information allows the IPR Program to inform low-skilled IT users not only that there is a database problem, but that this problem may impact the webserver as well. Additionally, when a problem impacts several applications, the low-skilled IT user may not understand which application to troubleshoot first. By maintaining dependency information, the IPR Program may guide the user through the troubleshooting process in the proper order. That is, the IPR Program may be configured to troubleshoot problems in the lower level of the application stack, e.g., the database, and progress upwards to higher level components, such as the webserver, until the problem is resolved.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating an exemplary computing environment 100, according to one embodiment of the invention. As shown, the computing environment 100 includes an IPR computer 160 and a monitored computer 110. The IPR computer 160 and the monitored computer 110 may be components of the same computer system or may be connected via a network 150, such as the Internet.

As shown, the IPR computer 160 includes a central processing unit (CPU) 164 connected to a memory 170, storage 166, and input device and output devices 168 via a bus 176. CPU 164 is included to be representative of a single CPU, multiple CPUs, a single CPU having multiple processing cores, and the like. Storage 166 stores application programs and data for use by computer system 160. Examples of storage 166 include one or more hard-disk drives, flash memory devices, optical media and the like. IPR computer 160 may be connected to a data communications network 150 (e.g., a local area network, which itself may be connected to other networks such as the internet).

Memory 170 can be one or a combination of memory devices, including random access memory, nonvolatile or backup memory, (e.g., programmable or flash memories, read-only memories, etc.). Additionally, IPR computer 160 may include input/output devices 168 such as a mouse, keyboard and monitor, as well as a network interface 162 used to connect IPR computer 160 to network 150.

Illustratively, the memory 170 of IPR computer 160 stores an operating system 172 used to manage hardware and software executing on the client computer 160. As shown, memory 170 also includes an IPR program 174 which, when executed by CPU 164, provides support for monitoring and troubleshooting problems in an application stack on the same or another computer system (e.g. monitored computer 110).

Similar to IPR computer 160, the monitored computer 110 generally includes a CPU 114, a memory 118, a network interface device 112, and a storage device 116, coupled via a bus 130. Memory 118 is a random access memory sufficiently large to hold the necessary programming and data structures that are located on the monitored computer 110. As shown, memory 118 stores an operating system 120 used to manage server hardware and software executing on the monitored computer 110.

Illustratively, memory 118 also includes an application stack 122. In one embodiment, the application stack 122 includes a collection of independent applications that work together to perform a task or provide users with a unified computing service, e.g., a web-application. In such a case, the application stack 122 may include a webserver 124, an application server 126, and a database 128. However, one of ordinary skill in the art will recognize that the particular components included in the application stack 122 are merely illustrative and embodiments of the invention may be adapted to support application stacks which include these or other applications. The programming and data structures of the application stack 122 may be accessed and executed by the CPU 114 as needed during operation. The monitored computer 110 may also include a network interface device 112 connecting server computer 110 to the network 150. (e.g., an analog modem, a wired network card, or a wireless network device).

As stated, the application stack 122 represents a set of applications running on one or more computer systems 110 to deliver a fully functional solution or service. The application stack 122 may include a wide assortment of applications that are often related, but are still separate and independent applications. The applications in application stack 122 interact with one another to provide a particular service to end users. Each application may have various dependencies upon one or more other applications, and a given application in the stack may depend upon a number of different services on a system 110. For example, the webserver 124 may depend upon middleware such as an application server 126 and a database 128. An application is said to depend on another application if the dependent program fails, the application would likewise fail (or otherwise operate incorrectly). For example, the webserver 124 may be dependent upon the database 128, such that if the database 128 experiences a problem, the webserver 124 would also experience a problem. For instance, if the webserver 124 commonly receives information which it then passes on to the database 128 for storage, if the database 128 were to run out of hard disk space and lose the ability to save records, the webserver 124 would no longer be able to pass information on for storage.

As another example, the webserver 124 may be configured to receive information in an HTTP form (e.g., through an HTTP post command) and provide this information to the application server 126. In turn, the application server 126 may generate a database query from the information included in the HTTP form, e.g., using information from the form to compose query conditions. The application server 126 may then establish a connection to the database 128, submit the query for execution, and receive a set of query results. Then, the application server 126 may compose an HTML page which includes the query results and return the page to the webserver 124 which itself sends the HTML page to a requesting client. As this example illustrates, although the webserver 124, the application server 126, and database 128, each provide an independent software application which operate collectively to provide a unified particular service to clients. Accordingly, errors experienced by one of the applications in application stack 122 may result in concomitant errors in other applications in the application stack 122.

In one embodiment, the IPR program 174 may be configured to monitor applications in the application stack 122 on the monitored computer 110 for problems. For instance, the IPR program 174 may monitor the webserver 124, application server 126 and database 128 running on the monitored computer 118. For example, in one embodiment, the IPR program 174 may observe log files of the applications in the application stack 122. This monitoring may be accomplished over a network 150 or may be accomplished locally if the IPR computer 160 and the monitored computer 110 are both components of the same computer system.

Figure 2:
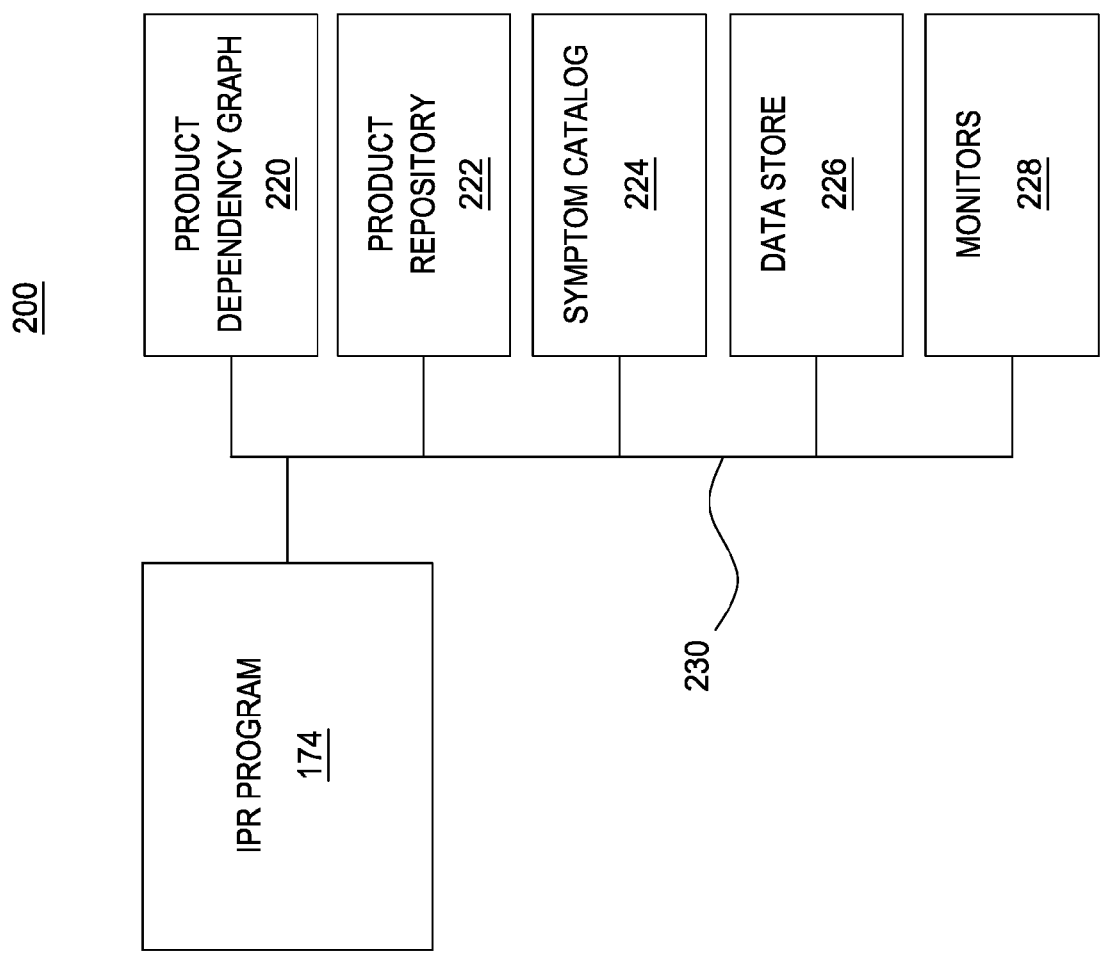
FIG. 2 is a block diagram further illustrating the components of the IPR Program first shown in FIG. 1, according to one embodiment of the invention.

FIG. 2 is a block diagram further illustrating components of the IPR Program 174 first shown in FIG. 1, according to one embodiment of the invention. As shown, the IPR Program 174 maintains a product dependency graph 220, a product repository 222, a symptom catalog 224, a data store 226, and monitors 228.

The product dependency graph 220 may contain information regarding which programs included in the application stack 122 depend on other applications. The product dependency graph 220 may also maintain information for identifying the instance of a dependent application installed on monitored system 110. For example, this information may include a name and path of a database, or a profile name of an application server. The product dependency graph 220 allows the IPR program 174 to identify a problem which occurs on the monitored system 110. In one embodiment, the IPR program 174 may populate the product dependency graph 220 when the IPR program 174 is installed, and may update the product dependency graph 220 when new programs are added to the application stack 122. That is, the product dependency graph 220 may be updated as programs or program components are added to the application stack 122.

FIG. 5 illustrates an example of a product dependency graph for an ACME Payroll Application 520. The product dependency graph shown in FIG. 5 illustrates what applications are present on the application stack 522, as well the dependencies 524 of the ACME Payroll Application 520. In this example, the applications include an Apache® webserver, a DB2® database, and a WebSphere® Application Server. Further, the dependency information 524 indicates which applications the ACME Payroll Application 520 depends on and information related to the location of those instances on a particular system. For example, the ACME Payroll Application 520 depends on the DB2 instance "db2inst1", whose path is "/home/db2inst1".

Referring again to FIG. 2, in one embodiment, IPR Program 174 also includes the program repository 222. The program repository 222 may contain meta-data regarding applications that may be included in the application stack 122. That is, the IPR Program 174 may maintain information about various applications in the product repository 222, such as what software and middleware an applications may are available to include in application stack 122. In one embodiment, developers or third parties may employ a toolkit to collect meta-data used to populate the product repository 222 at development time, while the knowledgebase itself is updated at application install time.

In one embodiment, when a new program is added to the application stack 122, the IPR Program 174 updates the product dependency graph 220 by pulling program dependency information from the program repository 222. For example, assuming only the application server 126 and the database 128 are present in the application stack 122, if a user subsequently adds the webserver 124 to the application stack, the IPR program 174 may update the product dependency graph 220 by importing dependency information for the webserver from the product repository 222. Similarly, if a user changes a component (e.g., changes the database 122 from one vender to another), the IPR program 174 may update the product dependency graph 220 by importing dependency information from the product repository 222.

The IPR program 174 may use a symptom catalog 224 for use in identifying problems in the application stack. In one embodiment, the symptom catalog 224 may provide an XML document that developers or third parties create externally from the IPR program 174 that contains information on potential problems. The symptom catalog 224 represents a knowledgebase of problems that can occur for different components which may be included in the application stack 122 and various solutions to these problems. The symptom catalog 224 may contain one or more problem signatures and problem definitions. Problem signatures may specify a set of symptoms used to identify a particular problem, represented by a set of rules that allow the symptoms of the problem to be identified. Additionally, the symptom catalog 224 may contain a set of suggested corrective actions to rectify a given problem.

Certain problems in the symptom catalog 224 may be self-correcting problems or are otherwise automatically corrected. For example, if the database 122 is restarted, a problem may occur as new records cannot be written while the database is down. In such a case, no corrective action may be needed, as the database 122 may automatically start up again, but a problem will still have occurred. An automatically correcting problem may be designated in the symptom catalog 224 by including an additional field (e.g., an annotation of "report=true" flag) in the problem's symptom definition. Furthermore, since corrective action is not required, an automatically corrected problem's symptom definition may include only textual recommendations to notify the user that the problem occurred and the impact of the problem (e.g., "Telephone service was interrupted because the VoIP server providing it stopped. The server was restarted and service should now be available").

In one embodiment, the IPR program 174 may employ one or more monitors 228. For example, IPR program 174 may configure one of the monitors 228 to monitor application log files produced by applications in the application stack 122. However, monitors 228 may monitor other sources of data or other events as well. Generally, monitors 228 monitor events that are available in a common format, such as the Common Base Event format. Alternatively, IPR program 174 may convert the events into a standardized format (e.g., the publically available Common Base Event standard). The IPR program 174 may use the symptom catalog 224 in conjunction with monitors 228 to analyze events and to monitor for problems in the application stack 122. However, the specific format of the events is not determinative of successful problem detection.

In one embodiment, the IPR program 174 may use the monitor 228 for a timed event. As used herein, a "timed event" refers to the absence of a response which could indicate a problem occurred. For instance, when an application fails to respond to a request, this may indicate the application is hanging or another problem has occurred. For example, the symptom catalog 224 may include an annotation of "timeout=nnn," where nnn indicates the amount of time that may acceptably elapse between the event that starts the timer and the event that ends the timer.

The symptom definition for a timed event may include both the match for the event and a start and an end trigger. If the monitor 228 detects an occurrence indicating a timed event has started, this may be recorded in the data store 226. The monitor 228 may also start a timer set to expire after nnn timer has elapsed. In one embodiment, a latency constant (C) is added to nnn time to account for any delay in the system and to ensure that sufficient time has elapsed so that any events are received within the time period nnn+C. The value of C may depend on the latency of the resources being monitored. If the monitor 228 receives an event matching the end trigger, the timer is stopped so long as the event was received within the nnn+C time allotted. In the case that an event is received before the timer expires, no further action is taken. However, if a timer expires, it may indicate that a problem has occurred.

In one embodiment, the IPR program 174 may maintain the data store 226, which contains information about problem signatures and instances of actual problem occurrences. The IPR program 174 may build the data store 226 at runtime. For each application in the application stack, the IPR program 174 may store new product signatures and corrective actions from the symptom catalog 224 in the data store 226, based on the actual components of the application stack 122. Additionally, when a monitor 228 detects a problem occurrence in the application stack 122, it may store a record of the problem in the data store 226, containing information such as the time of the problem occurrence, the problem's severity and a description of the problem.

Figure 3:
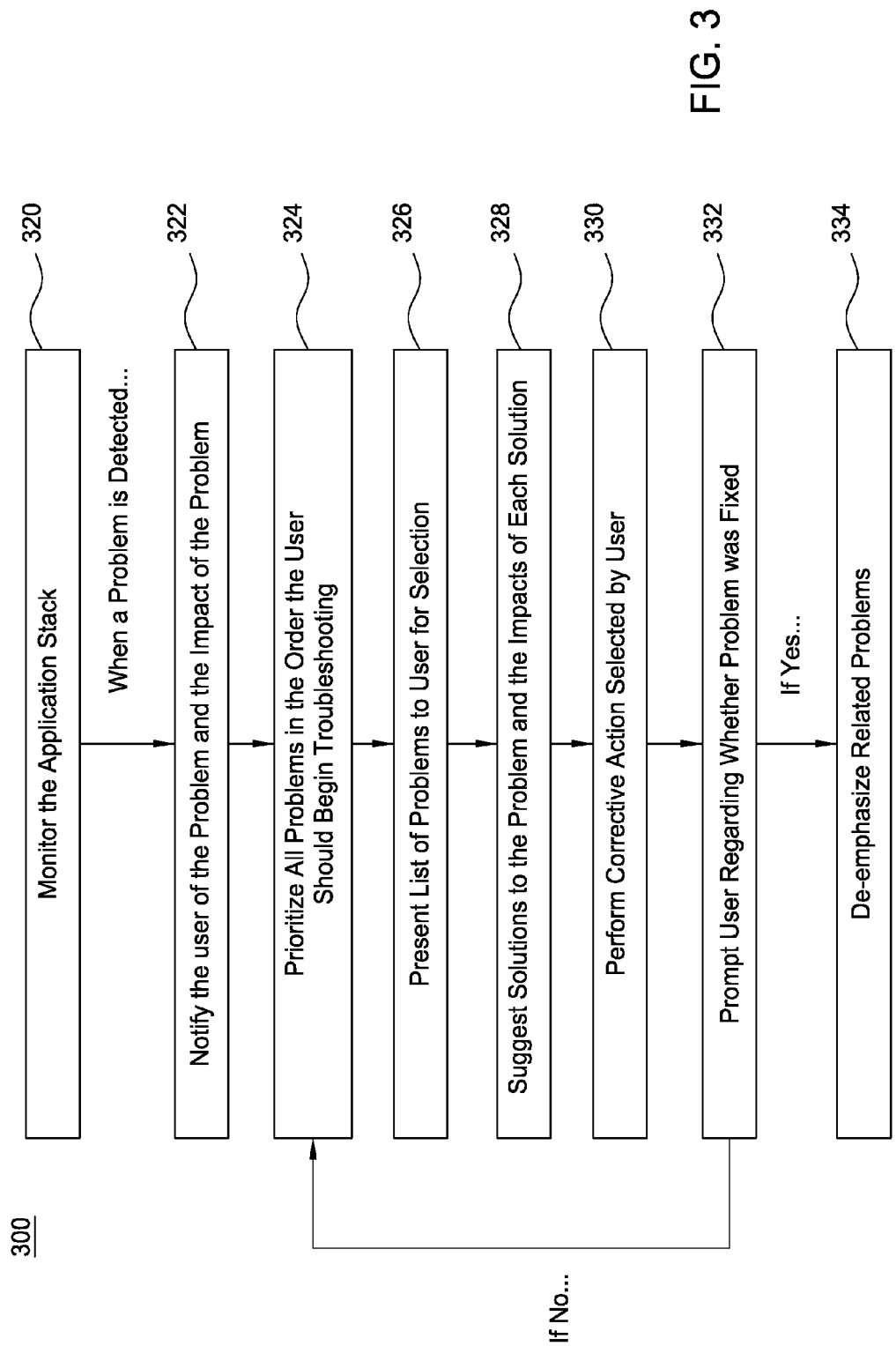
FIG. 3 is a flowchart illustrating a method for providing interactive problem resolution, according to one embodiment of the invention.

FIG. 3 is a flowchart illustrating a method 300 for monitoring an application stack, according to one embodiment of the invention. Certain elements of the method 300 are described relative to a series of graphical user interface screens depicted in FIGS. 6A-6D. As shown, the method 300 begins at step 320, where the IPR program 174 may employ one or more monitors 228 to watch for problem occurrences in the application stack. Generally, when one of the monitors 228 detects a possible problem occurrence, the IPR program 174 determines whether the occurrence matches a problem definition in the data store 226. If no match occurs, the IPR program 174 may assume that no actual problem has occurred. However, if the occurrence matches a problem definition, then the IPR program 174 may conclude that a problem has been detected.

Figure 6A:
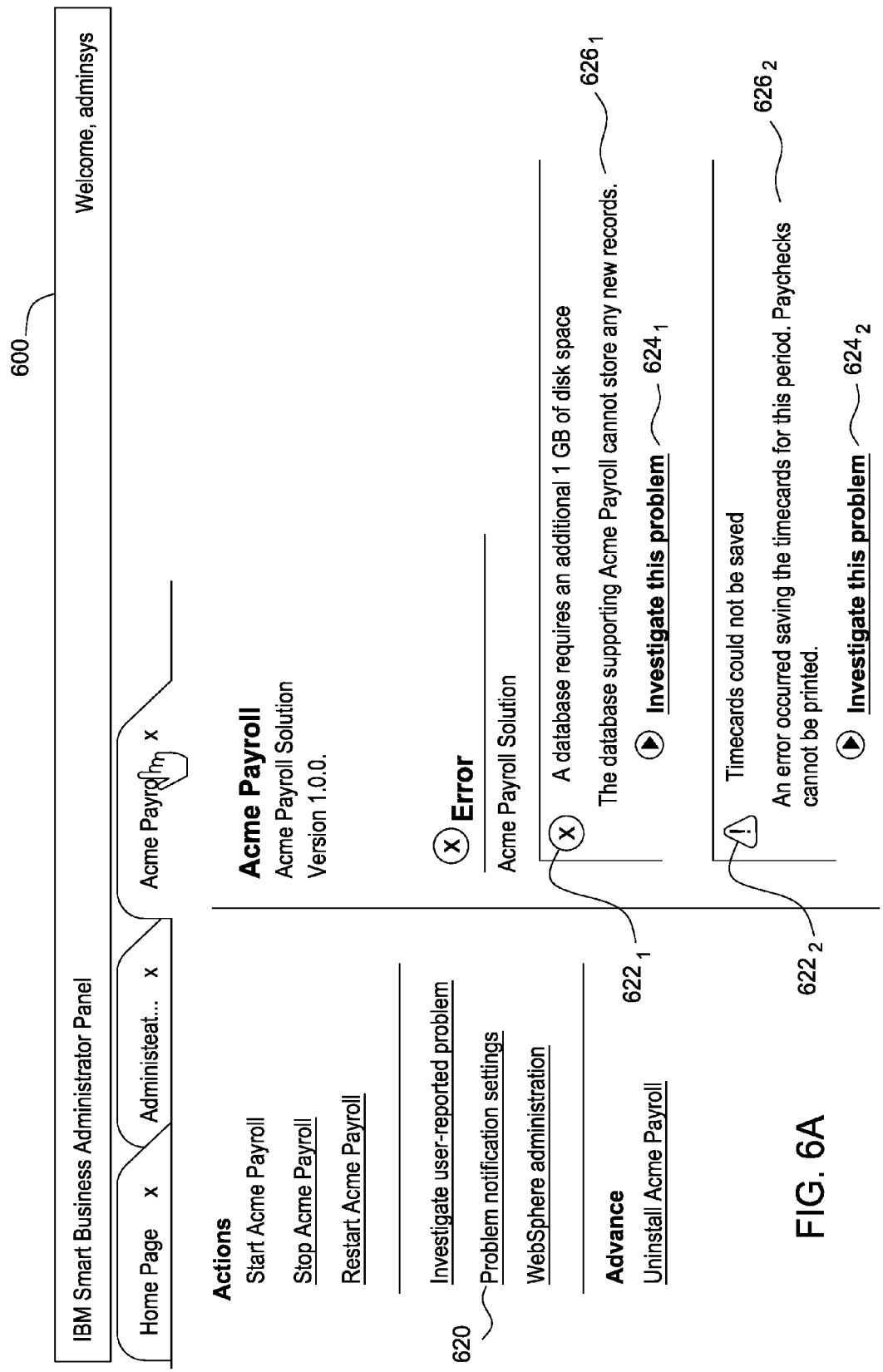

At step 322, once a problem has been detected, the IPR program 174 may notify users of the problem and its expected impact. Notification may be accomplished through various means, including email, RSS feeds, instant messages, etc., as well as through an interface provided by the IPR program 174 itself. For example, FIG. 6A shows an exemplary user interface, presenting a user with "problem notification settings" option 620 through which the user may specify what types of notification to use.

In addition to presenting technical error information, the IPR program 174 may use the product dependency graph 220 to determine components of the application stack which themselves depend on a component reporting an error. In one embodiment, this information is used to communicate to the low-skilled IT user what actual business impact may result from a particular problem. Further, the IPR program 174 may be configured to phrase problem impacts in terms intended to be understood by a low-skilled IT user. For example, the IPR program 174 may substitute variables representing the observed problem symptoms with meta-data contained in the symptom catalog 224. Such meta-data may describe the impact of the error on the malfunctioning component in the application stack, as well as the impact on other components of the application stack. Such a message may also include details of which end-user applications are affected by the problem, when the problem occurred, and the measure of severity of the problem. For example, a message conveying the impact of a problem to the user may be "Telephone service was interrupted because the VoIP server providing it stopped. The server was restarted and telephone service should now be available."

At step 324, the IPR program 174 may access the data store 226 and the product dependency graph 220 to determine which problems users should troubleshoot first. In one embodiment, the IPR program 174 may suggest that problems occurring in components lowest in the dependency stack should be resolved first. For example, if the webserver 124 depends on the database 128, and problems occur in each, the IPR program 174 may suggest that problems in the database 128 should be addressed first. This approach assumes that by fixing the database 128 problem, the webserver 124 problem may be corrected as well. Thus, low-skilled IT users benefit from this prioritization, as they may not be aware of the proper troubleshooting order and such knowledge allows them to better troubleshoot their application stack 122.

Accordingly, at step 326, the IPR program 174 may present the user with a list of problem occurrences in an order for troubleshooting, as determined using the data store 226 and the product dependency graph 220. For example, the IPR program 174 user interface may present information such as a technical description of each problem, the impact of each problem, and the severity of each problem. For example, FIG. 6A shows an exemplary user interface. As shown in FIG. 6A, an interface 600 for an "ACME Payroll application" is experiencing two problems. In this example, it is assumed that the ACME Payroll application depends on the database 128 and that the first problem has occurred because the database 128 requires more hard disk space. Also, the interface shows that the IPR program 174 has detected a second problem; namely, that the ACME Payroll application is unable to save timecards. Accordingly, the interface 600 displays a first problem description $626_1$ and a second problem description $626_2$.

In addition to presenting technical error information, the IPR program 174 may communicate the business impact of a problem to users. For example, in FIG. 6A, first problem description $626_1$, conveys not only the technical error ("A database requires an additional 1 GB of disk space"), but also conveys the business impact of this problem to the user ("The database supporting ACME Payroll cannot store any new records."). The interface 600 also communicates the severity of each problem to users—using icons $622_1$ and $622_2$ in this example. Additionally, the first and second problem descriptions $626_1$ and $626_2$ are presented in order for troubleshooting (as determined in step 324 of method 300). Accordingly, interface 600 shows the lower-level database problem listed above the higher-level timecard problem. The interface 600 also provides a button $624_1$ and a button $624_2$ for initiating the troubleshooting process for each of the problems.

Figure 6B:
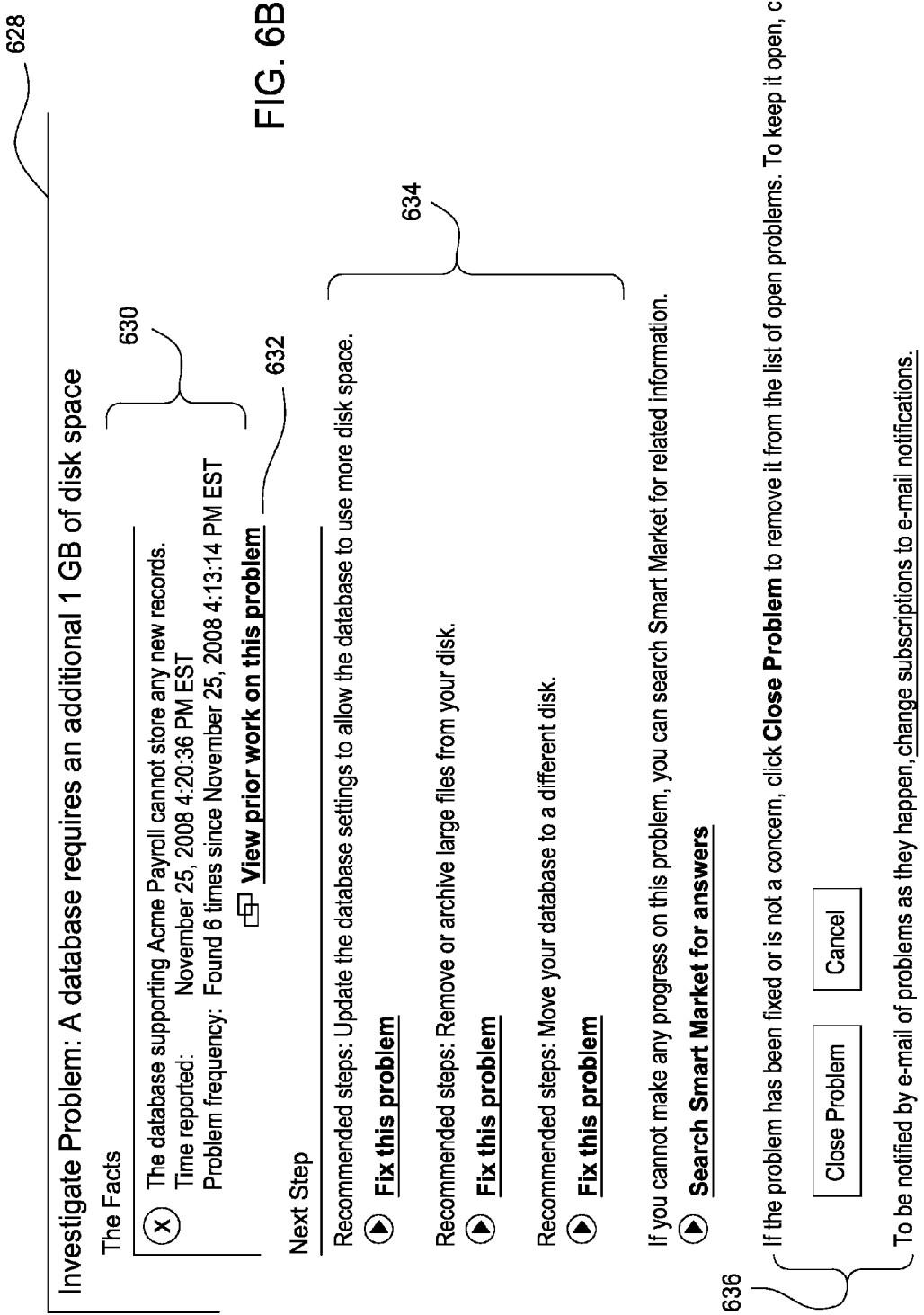

Referring again to method 300 of FIG. 3, at step 328, the IPR program 174 may suggest solutions for correcting the listed problems, as well as the potential impact from solutions. These solutions may be steps that users can authorize the IPR program 174 to perform, or they may be steps users undertake themselves. As an example, FIG. 6B shows an exemplary user interface 628 for suggesting problem solutions. Such an interface may include specific details in a problem description 630, such as the impact of the problem ("The database supporting Acme Payroll cannot store any new records"), when the problem occurred ("Nov. 25, 2008 4:20:36 PM EST"), and how many times the problem has occurred in the past ("Found 6 times since Nov. 25, 2008 4:13:14 PM EST"). Link 632 allows users to view previous recommendations performed to correct this problem. Interface 628 also includes a list 634 of additional corrective steps that may be performed to remedy the problem listed in problem description 630, such as "Update the database settings to allow the database to use more disk space", "Remove or archive large files from your disk", and "Move your database to a different disk."

As there may be multiple ways to fix a particular problem, and thus multiple corrective actions in the data store 226 for a given problem signature, the IPR program 174 may present the user with a variety of solutions. For instance, FIG. 6B illustrates an example where the database which the ACME Payroll application depends on has run out of hard disk space, and thus can no longer store new records. Illustratively, the list 634 presents users with multiple choices for correcting this problem. For example, the list 634 presents a list of other choices, including changing the database settings, removing other files from the hard disk, and moving the database to a larger hard disk. Further, interface 628 also includes an option for closing 636 the problem. Such an option may allow users to not perform any particular corrective action. For example, if the user has already corrected the problem and does not need the IPR program 174 to perform additional corrective action, then the user may use button 636 to close the problem.

Figure 6C:
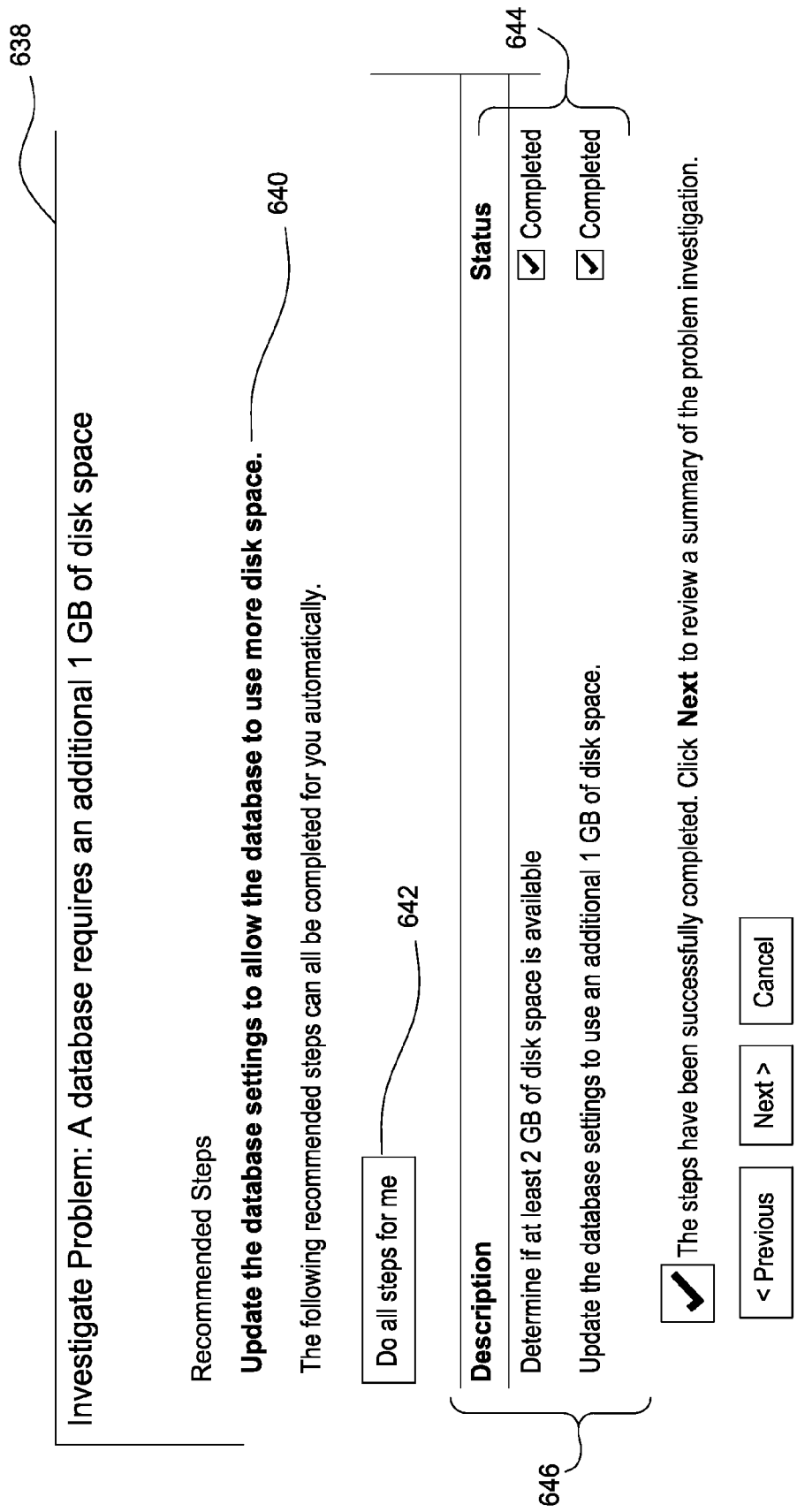

Referring again to method 300 of FIG. 3, at step 330, once the user selects a corrective action, the IPR program 174 may assist the user in performing such action (step 330). For example, FIG. 6C shows an exemplary user interface 638 for performing a corrective action selected by the user. In this example, the user has selected a corrective step 640 to be taken; namely, that the IPR program 174 should update the database settings to allow the database to use more disk space. Further, in this example, the interface 638 presents the present corrective actions to low-skilled IT users in general terms 640.

As shown, interface 638 shows a set of specific steps 646 carried out to perform the selected corrective step 640. For example, before updating database settings to use additional disk space, it may be pertinent to confirm that additional disk space is available. Thus, while users may select corrective action in more general terms, the IPR Program 174 may also inform users of the specifics steps 646 included in the selected corrective action 640 or validate that resources required for a given step are indeed available. For example, the specific steps 646 included in the interface 638 include a step of determining whether "at least 2 GB" of disk space is available and a step for updating the database to use an additional 1 GB of space. Additionally, interface 638 also provides a button 642 for initiating any corrective action, and notifies users when a corrective action has completed (as shown by statusboxes 644). In some cases, a corrective action may be disruptive and require users to lose connectivity to the IPR Program's 174 user interface. In such a scenario, users may be informed of this before the disruptive action is performed. When users reconnect to the user interface, problem resolution may continue from the same position. For example, if a user loses connectivity at the screen shown in FIG. 6C, the IPR program 174 may restore the user to the same screen upon reconnection.

Additionally, in some cases, a selected corrective action may be disruptive in that it impacts other applications or services. In such cases, the IPR program 174 may notify users of the impact of the corrective action before any such action is performed. The IPR program 174 may accomplish this using the product dependency graph 220. For example, by knowing on which applications the database 128 depends, the IPR program 174 may determine which applications may be disrupted when the database 128 goes offline. To further illustrate, if the user selects a corrective action that will restart the database 128, the IPR program 174 may inform the user that the webserver 124, which depends on the database 128, will not be able create any new records for a period of time. This enables low-skilled IT users to understand a corrective action's impact on their application stack 122, and make a well-informed decision of whether (and when) to take such corrective action.

While a suggested corrective action will often remedy a particular problem, this is not always the case and further corrective action may be required. Accordingly, referring again to method 300 of FIG. 3, once a corrective action has been performed (step 330), the IPR program 174 may prompt the user to determine whether the problem has been corrected (step 332). For example, FIG. 6D illustrates an interface 648 presents users a summary 650 of the correction action taken. As shown, summary 650 indicates that the selected action (e.g., the action of allowing the database to consume more disk space) was successfully completed, and so the problem should be fixed. Additionally, the summary 650 includes a problem description and the recommended corrective steps that were performed. Interface 648 also includes a prompt 652 allowing a user to indicate whether the problem was corrected.

At step 324, if a user indicates that the application is still experiencing problems, the IPR program 174 may prioritize the remaining problem occurrences and allow user to continue troubleshooting. The IPR program 174 may also present users with additional tools and information to assist in troubleshooting the problem. For example, FIG. 6D shows an interface 648 presenting a user with alternative actions 654 to aid users in troubleshooting. In the example of FIG. 6D, the alternative actions include searching a reference for solutions to problems or gathering diagnostic system and application data.

At step 334, if a user indicates that the application is now working properly, the IPR program 174 may de-emphasize any related problems. In one embodiment, the IPR program 174 may determine problems are related when a user indicates that the application stack is functioning properly after correcting a problem in a lower-level application. In such a case, the IPR program 174 may conclude that problems in higher-level applications in the application stack were resolved when the problem in the lower-level application was corrected. Further, the IPR program 174 may not remove a problem occurrence from the data store 226 when the problem is de-emphasized, but rather remove the problem from a current list of problems.

Figure 4:
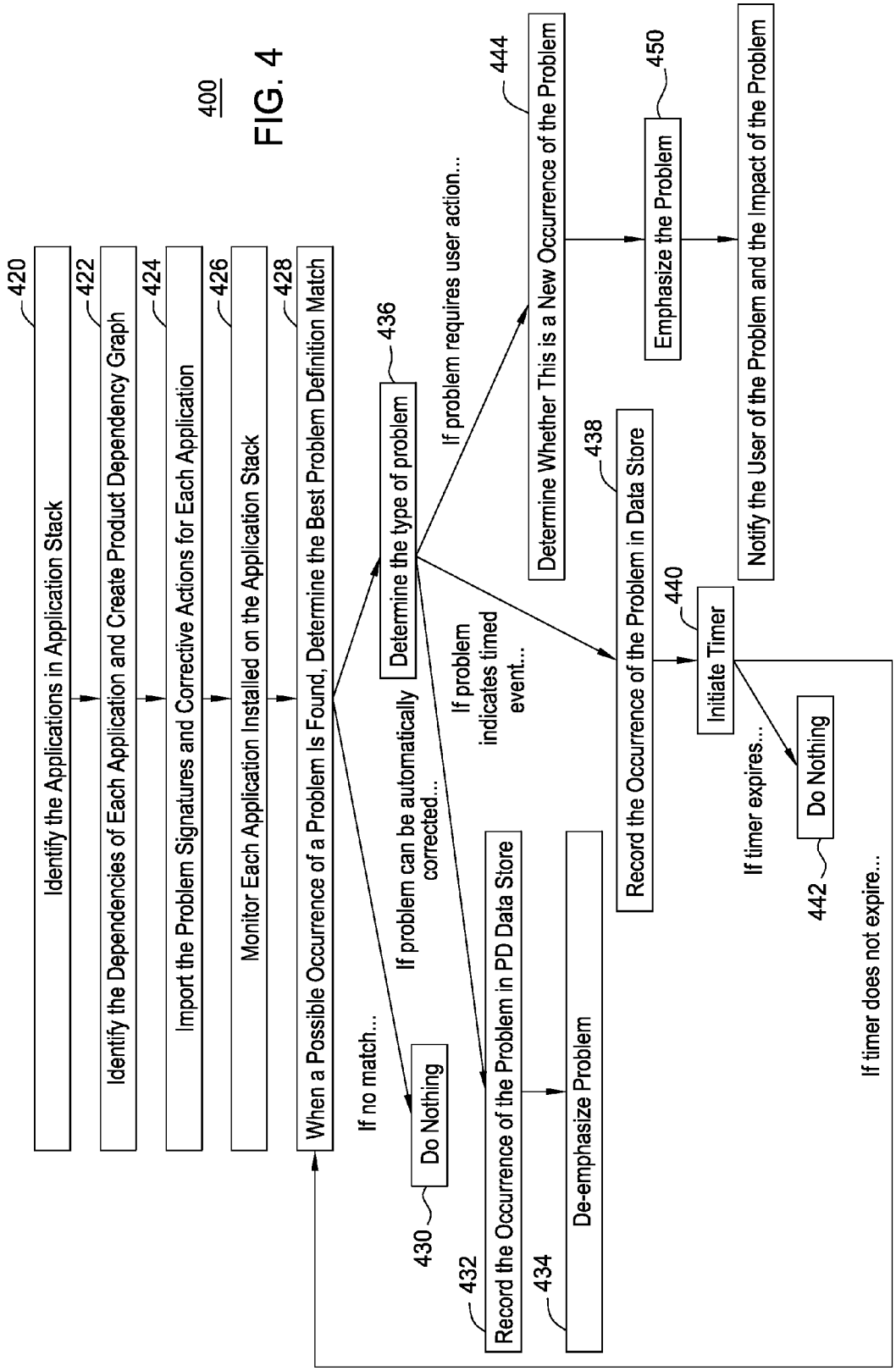
FIG. 4 is a flowchart illustrating a method for monitoring an application stack, according to one embodiment of the invention.

FIG. 4 is a flowchart illustrating a method 400 for providing interactive problem resolution, according to one embodiment of the invention. As shown, the method 400 begins at step 420, where the IPR program 174 determines a set of applications included in the application stack 122. In one embodiment, the IPR program 174 may determine what applications are included in the application stack when the IPR system 160 is installed on the IPR system 160. Further, the IPR program 174 may also be updated as applications are installed on (or removed from) the monitored system 110.

At step 422, the IPR program 174 may generate a product dependency graph 220. As described above, the product dependency graph 220 may indicate the dependencies the applications in the application stack 122 have relative to one another. This may be done when the IPR program 174 is installed on the IPR system 160. Additionally, the product dependency graph may be updated as new programs are added to (or removed from) the application stack 122. Additionally, the IPR program 174 may import a set of problem signatures and corresponding corrective actions from the symptom catalog 224 into the data store 226 (step 424). For instance, in an application stack 122 which includes a webserver, a database and an application server (e.g., the application stack 122 of FIG. 1), the IPR program 174 may import problem signatures and corrective actions related to these three applications into the data store 226.

At step 426, the IPR program 174 may configure monitors 228 for applications in the application stack 122. When one of the monitors 228 detects a possible problem occurrence, the IPR program 174 may determine which application originated the possible problem occurrence. Additionally, the IPR program 174 may access data store 226 to determine which problem signature best matches the possible problem occurrence (at step 428). For example, the IPR program 174 may examine the problem signatures in the data store 226 that may be generated by the particular application originating the possible problem occurrence. If no problem signature matches the possible problem occurrence, the IPR program 174 takes no further action (at step 430).

Otherwise, at step 436, if the IPR program 174 detects a match, the IPR program 174 may determine which type of problem has occurred. The IPR program 174 may respond to different types of problems in different ways. For instance, if the IPR program 174 detects a problem where the database 128 was inaccessible for a period of time but is now accessible again, the IPR program 174 may create a record of this problem, but because the problem has automatically corrected itself or has otherwise been corrected, take no further action. As another example, the IPR program 174 may detect a problem where the database 128 requires additional hard disk space, which may require user interaction to correct.

At step 432, if the problem may correct itself, the IPR program 174 may record a log of the problem occurrence in the data store 226. The log may include information about which application in the application stack originated the problem, when the problem occurred, and a measure of the severity of the problem. The IPR program 174 may also determine what elements of the application stack depend on the application experiencing the problem by referencing the product dependency graph 220. This information may be used to record in data store 226 which additional applications may be impacted by the problem occurrence.

At step 434, the IPR program 174 may de-emphasize the problem, as the problem has already corrected itself and no user interaction is required. For instance, if the IPR program 174 detects database 128 crashed but has subsequently been restarted and is now accessible, the IPR program 174 may log this problem in the data store 226 to make users aware the problem occurred, but may de-emphasize the problem. Additionally, IPR program 174 may use the product dependency graph 220 to determine the components dependent upon the component reporting the error. Doing so allows the IPR program 174 to communicate the business impact of the problem to users. As an example, if the database 128 restarted and was inaccessible for a period of 5 minutes, but is now again accessible, the IPR program 174 may record the impact as "The database was offline from 2:45 pm until 2:50 pm. New orders placed through the webserver during this time may not have been saved to the database." This allows low-skilled IT users to understand not only that a problem occurred, but also what was affected by the problem.

Returning to step 436, if the IPR program 174 detects a problem occurrence that indicates the beginning of a timed event, the IPR program 174 may record the occurrence of the problem in the data store 226 (step 438). Additionally, the IPR program 174 may initiate a timer (step 440) for nnn+C time, where nnn denotes the amount of time that may acceptably elapse between the event that starts the timer and the event that ends the timer, and C denoting a latency constant to account for any delay in the system. The IPR program 174 may stop the timer when an end trigger event occurs. If such an end trigger event is received before the timer expires, the IPR program 174 may do nothing further for this problem occurrence (step 442), as the end trigger event indicates that no problem has occurred. For example, a timed event may have a start trigger of sending a request to the database 128 in application stack 112, and an end trigger of receiving a response back from the database 128. If a response is received within nnn+C time, this may indicate that the database 128 is functioning properly. Alternatively, if no response is received from the database 128 within the allotted time, this may indicate the database 128 process is hanging and corrective action is required. Thus, in the event a timer expires, the IPR program 174 assumes a problem has occurred and must determine what type problem has occurred (step 428).

Returning again to step 436, if the IPR program determines that user action is required to resolve the problem, then the IPR program 174 may determine whether this is a new or repeat occurrence of the problem (step 444). The IPR program 174 may then emphasize the problem (step 450) and notify users of the problem occurrence and of the problem's impact on the application stack 122.

Advantageously, embodiments of the invention generally provide a system, method and article of manufacture for monitoring an application stack and repairing, or guiding a user through repairing, problems detected in the application stack. For example, an interactive problem resolution program (IPR Program) installed on a computer system may monitor and assist users in troubleshooting an application stack installed on a separate computer system. Generally, when a problem in the application stack is detected, the IPR Program may alert users to the problem and provide information about the problem to guide users in taking steps to correct the problem.

While the foregoing is directed to embodiments of the present invention, other and further embodiments of the invention may be devised without departing from the basic scope thereof, and the scope thereof is determined by the claims that follow.

What is claimed is:

1. A computer-implemented method for providing interactive problem resolution for a problem detected in a monitored application stack, comprising configuring one or more processors to perform an operation comprising:
   detecting an occurrence of a problem with a first application in the monitored application stack, wherein the monitored application stack includes a plurality of applications and wherein a second application in the monitored application stack has an operational dependency on the first application;
   determining a primary impact of the detected problem on the first application;
   determining, based on the operational dependency, a secondary impact of the detected problem on the second application;
   generating a first description of the primary and secondary impacts of the detected problem in terms of observable application behaviors of the first and second applications;
   generating a second description of one or more suggested corrective actions to remedy the detected problem; and
   outputting the first description and the second description to a graphical user interface display.

2. The method of claim 1, wherein the secondary impact is determined from a product dependency graph indicating interdependencies between the plurality of applications included in the monitored application stack.

3. The method of claim 2, wherein the one or more suggested corrective actions are prioritized according to the interdependences between the plurality of applications included in the monitored application stack.

4. The method of claim 1, wherein the application stack includes at least a database, an application server, and a webserver.

5. The method of claim 1, further comprising:
   performing a first corrective action to remedy the detected problem on the first application;
   upon determining the first corrective action resolves the detected problem on the first application, determining whether the secondary impact on the second application has been resolved; and
   if not:
      generating a third description of one or more suggested corrective actions to resolve the secondary impact on the second application, and
      presenting the third description on the graphical user interface display.

6. The method of claim 1, wherein presenting the second description on a graphical user interface display, comprises:
   emphasizing one or more suggested corrective actions for the first application; and
   deemphasizing one or more suggested corrective actions for the second application.

7. The method of claim 1, wherein the problem is detected by monitoring application log files maintained by the first application.

8. A computer-readable storage medium containing a program which, when executed, performs an operation for providing interactive problem resolution for a problem detected in a monitored application stack, the operation comprising:
   detecting an occurrence of a problem with a first application in the monitored application stack, wherein the monitored application stack includes a plurality of applications and wherein a second application in the monitored application stack has an operational dependency on the first application;
   determining a primary impact of the detected problem on the first application;
   determining, based on the operational dependency, a secondary impact of the detected problem on the second application;
   generating a first description of the primary and secondary impacts of the detected problem in terms of observable application behaviors of the first and second applications;
   generating a second description of one or more suggested corrective actions to remedy the detected problem; and
   outputting the first description and the second description to a graphical user interface display.

9. The computer-readable storage medium of claim 8, wherein the secondary impact is determined from a product dependency graph indicating interdependencies between the plurality of applications included in the monitored application stack.

10. The computer-readable storage medium of claim 9, wherein the one or more suggested corrective actions are prioritized according to the interdependences between the plurality of applications included in the monitored application stack.

11. The computer-readable storage medium of claim 8, wherein the application stack includes at least a database, an application server, and a webserver.

12. The computer-readable storage medium of claim 8, wherein the operation further comprises:
   performing a first corrective action to remedy the detected problem on the first application;
   upon determining the first corrective action resolves the detected problem on the first application, determining whether the secondary impact on the second application has been resolved; and
   if not:
      generating a third description of one or more suggested corrective actions to resolve the secondary impact on the second application, and
      presenting the third description on the graphical user interface display.

13. The computer-readable storage medium of claim 8, wherein presenting the second description on a graphical user interface display, comprises:
   emphasizing one or more suggested corrective actions for the first application; and
   deemphasizing one or more suggested corrective actions for the second application.

14. The computer-readable storage medium of claim 8, wherein the problem is detected by monitoring application log files maintained by the first application.

15. A system, comprising:
   a processor; and
   a memory containing a interactive problem resolution (IPR) application, which, when executed on the processor is configured to perform an operation for providing interactive problem resolution for a problem detected in a monitored application stack, the operation comprising:
      detecting an occurrence of a problem with a first application in the monitored application stack, wherein the monitored application stack includes a plurality of applications and wherein a second application in the monitored application stack has an operational dependency on the first application,
      determining a primary impact of the detected problem on the first application,
      determining, based on the operational dependency, a secondary impact of the detected problem on the second application,
      generating a first description of the primary and secondary impacts of the detected problem in terms of observable application behaviors of the first and second applications,
      generating a second description of one or more suggested corrective actions to remedy the detected problem, and
      presenting the first description and the second description on a graphical user interface display.

16. The system of claim 15, wherein the secondary impact is determined from a product dependency graph indicating interdependencies between the plurality of applications included in the monitored application stack.

17. The system of claim 16, wherein the one or more suggested corrective actions are prioritized according to the interdependences between the plurality of applications included in the monitored application stack.

18. The system of claim 15, wherein the application stack includes at least a database, an application server, and a webserver.

19. The system of claim 15, wherein the operation further comprises:
   performing a first corrective action to remedy the detected problem on the first application;
   upon determining the first corrective action resolves the detected problem on the first application, determining whether the secondary impact on the second application has been resolved; and
   if not:
      generating a third description of one or more suggested corrective actions to resolve the secondary impact on the second application, and
      presenting the third description on the graphical user interface display.

20. The system of claim 15, wherein presenting the second description on a graphical user interface display, comprises:
   emphasizing one or more suggested corrective actions for the first application; and
   deemphasizing one or more suggested corrective actions for the second application.

21. The system of claim 15, wherein the problem is detected by monitoring application log files maintained by the first application.

* * * * *